US009229997B1

(12) United States Patent
Raghavan et al.

(10) Patent No.: US 9,229,997 B1
(45) Date of Patent: Jan. 5, 2016

(54) EMBEDDABLE CLOUD ANALYTICS (71) Applicant: Amazon Technologies, Inc., Seattle, WA (US)

(72) Inventors: Srinivasan Sundar Raghavan, Mercer Island, WA (US); Swaminathan Sivasubramanian, Sammamish, WA (US); Timothy Andrew Rath, Des Moines, WA (US); Mukul Vijay Karnik, Redmond, WA (US); Amol Devgan, Seattle, WA (US); Santosh Kalki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/494,413

(22) Filed: Sep. 23, 2014

Related U.S. Application Data

(60) Provisional application No. 62/015,302, filed on Jun. 20, 2014.

(51) Int. Cl.
*G06F 7/04* (2006.01)
*G06F 12/00* (2006.01)
*G06F 17/30* (2006.01)
*H04L 29/06* (2006.01)
*H04L 29/08* (2006.01)

(52) U.S. Cl.
CPC ......... *G06F 17/30563* (2013.01); *H04L 63/10* (2013.01); *H04L 67/1097* (2013.01)

(58) Field of Classification Search
CPC .................. G06F 17/30563; H04L 67/1097
USPC ................. 726/2, 5, 7, 12; 713/155, 156, 88
See application file for complete search history.

(56) References Cited

U.S. PATENT DOCUMENTS

| 8,245,290 | B2 * | 8/2012 | Hosoda .......................... 726/17 |
| 8,417,723 | B1 | 4/2013 | Lissack et al. |
| 2011/0314523 | A1 * | 12/2011 | Blumenfeld et al. ............. 726/4 |
| 2013/0254838 | A1 * | 9/2013 | Ahuja et al. ...................... 726/1 |

OTHER PUBLICATIONS

"OLAP & Data Mining"—Mohamed Eltabakh, Worcester Polytechnic Institute (WPI), Apr. 2012 http://web.cs.wpi.edu/~cs561/s12/Lectures/IntegrationOLAP/OLAPandMining.pdf.*
International Patent Application No. PCT/US2015/036835; Int'l Search Report and the Written Opinion; dated Oct. 23, 2015; 12 pages.

* cited by examiner

*Primary Examiner* — Randy Scott
(74) *Attorney, Agent, or Firm* — Baker & Hostetler LLP (57) ABSTRACT

An analytics module may be embedded into an application developed, published, or used by an entity in addition to the owner of the data under analysis. An access token may be submitted by the analytics module to a provider of hosted services. The access token may correspond to an n-dimensional cube containing data at a level of granularity permitted to the application. The access token may incorporate additional policies controlling access to the corresponding n-dimensional cube.

22 Claims, 8 Drawing Sheets

FIG. 7

EMBEDDABLE CLOUD ANALYTICS

CROSS-REFERENCES TO RELATED APPLICATIONS

This application claims benefit under 35 U.S.C. §119(e) of U.S. Provisional Patent Application No. 62/015,302, filed Jun. 20, 2014, the contents of which are hereby incorporated by reference in its entirety.

This application is also related to application entitled "AUTOMATED HIERARCHY DETECTION FOR CLOUD-BASED ANALYTICS," U.S. Provisional Patent Application No. 62/015,308, filed on Jun. 20, 2014, as well as application entitled "REAL-TIME HOSTED SYSTEM ANALYTICS," U.S. Provisional Patent Application No. 62/015,294, filed on Jun. 20, 2014, as well as application entitled "CLOUD ANALYTICS MARKETPLACE," U.S. Provisional Patent Application No. 62/015,307, filed on Jun. 20, 2014, and application entitled "DYNAMIC CUBES FOR CLOUD-BASED ANALYTICS," U.S. Provisional Patent Application No. 62/015,312, filed on Jun. 20, 2014, which are hereby incorporated by reference in their entireties.

BACKGROUND

Online analytical processing ("OLAP") and other types of data warehouse systems may be used to perform various functions related to data mining, reporting, and forecasting. These types of systems may permit multidimensional analysis of data typically obtained from transaction-oriented systems and loaded into a multidimensional cube structure, on which data analytics may be performed. Although various commercial products may be used in the design and deployment of data warehouse systems, most such systems contain various proprietary components and are not suited for use by third parties.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Various aspects of the present disclosure may be employed to embed cloud-based analytics features within application programs. In various cases and embodiments, cloud-based analytics features developed by a first entity may be embedded in an application program developed by a second entity. In various cases and embodiments, the data under analysis may be maintained or provided by the first entity, the second entity, or an additional entity. Scenarios such as this may be described as "third-party" analytics, indicating that the source or sources of the data, the provider of the analytics functionality, the publisher of an application incorporating the analytics functionality, and the user of the application are not necessarily the same party.

Embodiments of the present disclosure may employ a token-based mechanism for providing secure access to analytics information and for use in conjunction with a scalable, multi-tenant analytics platform.

Figure 1:
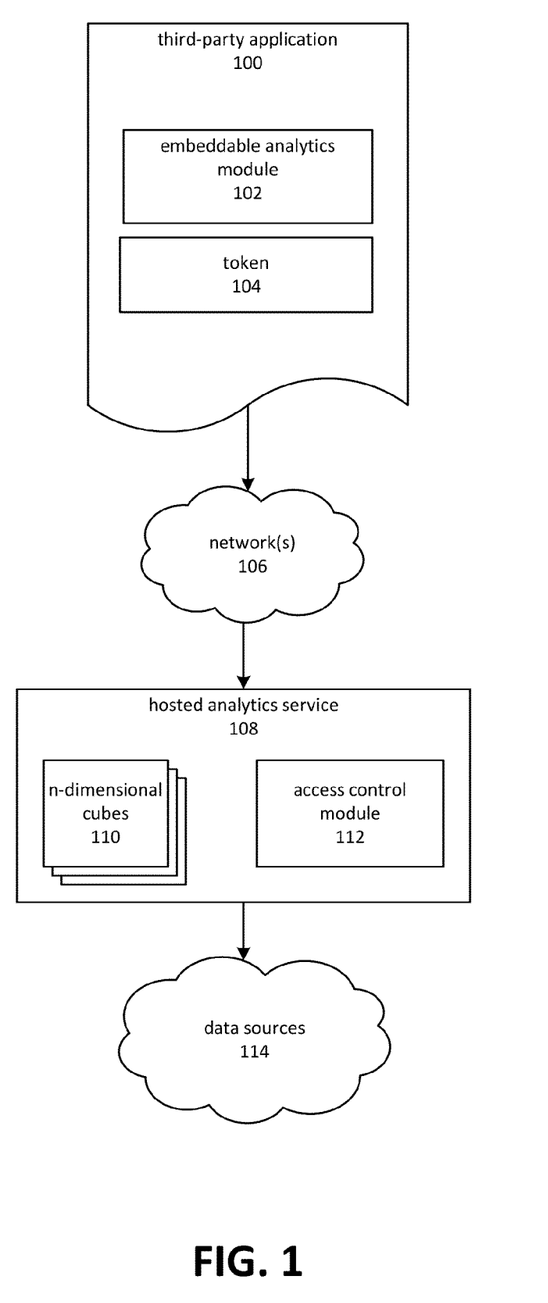
FIG. 1 is a block diagram depicting a hosted analytics system in which analytics may be embedded in third-party applications.

FIG. 1 is a block diagram depicting a hosted analytics system in which analytics may be embedded in a third-party application 100. Embedded analytics may include facilities for performing online analytical processing ("OLAP") on a data set. The analytic processing may comprise summarizing and drilling-down on data in various dimensions, grouping according to various hierarchies, and so on. The analytic processing may be described as interactive because it may be performed relatively quickly compared to slow-running queries sometimes performed on transactional database systems. The term "third party" may, for example, refer to an application published by an entity other than an entity associated with the data to be analyzed.

Analytic processing may occur through embeddable analytics module 102 communicating over network(s) 106 with a hosted analytics service 108. The term module, as used herein, may include various types of declarative or procedural code, such as hypertext markup language ("HMTL"), code, compiled instructions, and so forth. A module may be distributed as one or more documents or files. A module may also be executed or rendered on a server on behalf of a client process, such as a browser.

A request to perform analytics may originate in third-party application 100. An embeddable analytics module 102 may form the request and transmit it to hosted analytics service 108 for processing. The request may include a query (not shown) and a token 104, which may be used in various embodiments to regulate access to analytics.

A token 104 may also be associated with third-party application 100 and embeddable analytics module 102. It may, for example, be distributed along with other resources used by third-party application 100.

A provider of hosted analytics service 108 may issue token 104 to entities, such as a publisher or to end-users for use with third-party application 100. For example, a provider of hosted analytics service 108 might provide token 104 to the publisher of third-party application 100. The publisher could then include a copy of the token with copies of third-party application 100. For an HTML-based application, a copy of token 104 could be downloaded with the HTML page, for example.

An access control module 112 may regulate security and access for requests to perform various analytic functions. An access control module 112 may perform functions including enforcing security policies indicated by token 104. In some embodiments, access control module 112 may also enforce security policies that are not described by token 104.

A plurality of n-dimensional cubes 110 may be maintained by hosted analytics service 108. An access control module 112 may implement an association between token 104, or a subcomponent of token 104, and one of n-dimensional cubes 110. Analytics queries may be processed using the n-dimensional cube that is associated with the token. Data included in the associated n-dimensional cube may reflect dimensions that may be accessed by third-party application 100 consistent with a policy set by a provider of hosted analytics service 108. There may, however, be certain data that may not be drilled down into without violating a policy associated with token 104. For example, the policy might dictate that quarterly sales figures are viewable but that monthly or weekly figures are not. Access may be controlled in a variety of ways, including omitting lower levels of detail from an n-dimensional cube that is associated with token 104. In other words, data may be stored in the associated n-dimensional cube in aggregated form, omitting lower-level details. Continuing the previous example, an n-dimensional cube associated with token 104 may include quarterly data but omit monthly or weekly data.

As used herein, the terms n-dimensional cube, multidimensional cube, cube, multidimensional array, n-dimensional array, and so forth may be used interchangeably. The particular term used should not be construed as implying a restriction or limitation on the number of dimensions represented by a structure. Accordingly, both an n-dimensional cube and a cube, for example, may include more than or fewer than three dimensions.

The data in n-dimensional cubes 110 may be maintained by a hosted analytics service 108. The data may be obtained from a variety of data sources 114, which may include transactional data, real-time data, and so on. Data may be routed from data sources 114 through techniques, such as a multiplexing pipeline that performs operations—such as data cleansing, aggregation, and routing to a destination n-dimensional cube. Embodiments may maintain n-dimensional cubes 110 so that individual n-dimensional cubes contain detail levels that correspond to a permitted level of detail.

Figure 2:
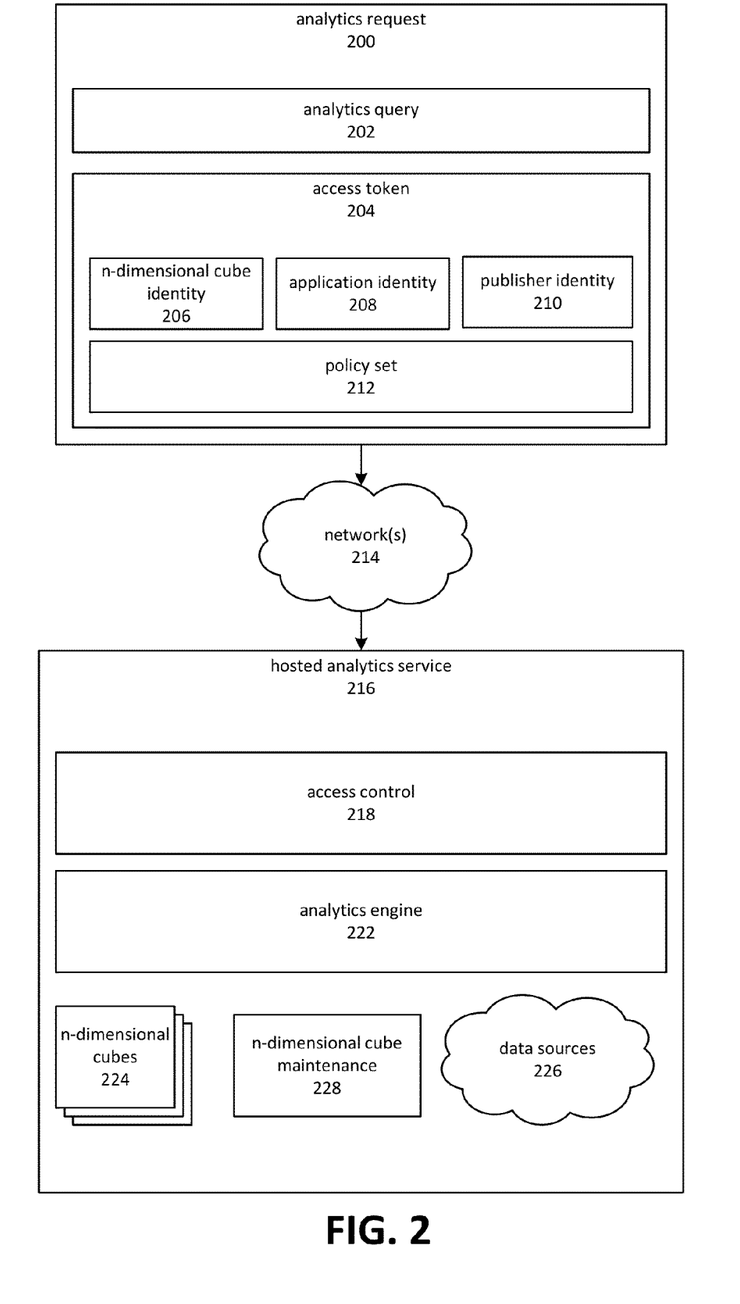
FIG. 2 is a block diagram of a system for using token-based security for embeddable analytics.

FIG. 2 is a block diagram of a system for using token-based security for embeddable analytics. A client device (not shown) may form analytics request 200. The analytics request 200 may comprise an analytics query 202 and an access token 204. An analytics query 202 may comprise information indicating data to be retrieved, analysis to be performed, and so forth. A query may be expressed using a computing language, such as structured query language ("SQL"), multidimensional expressions ("MDX"), and so forth. Binary query representations may also be used in various embodiments.

An access token 204 may comprise representations of various forms of information, several examples of which are depicted in FIG. 2. For example, access token 204 may contain information pertaining to n-dimensional cube identity 206. This information may indicate a correspondence between the token and an n-dimensional cube that may be used to process the request. Embodiments may also maintain a correspondence between a token and an n-dimensional cube based on other information embedded in access token 204, such as application identity 208 or publisher identity 210. Access token 204 may include information embedded in uniform resource locators ("URLs"), binary information, alphanumeric strings, and so on. In some cases and embodiments, access tokens may be encrypted using public and private keys. In some cases and embodiments, access tokens may be made publicly available, so that the back-end of a hosted analytics service may be provided to the general public. In such cases, embodiments may request or require additional information to be submitted with analytics requests for the purposes of identifying the part that is making use of the service. Embodiments may also perform usage tracking to identify the party that is using the service, how often the service is being used, and so forth.

An access token 204 may contain application identity 208 to indicate the application with which the token is associated. By including this information in access token 204, an application's identity may be verified, in various embodiments, based at least in part on this information. Embodiments may also use publisher identity 210, which may include information indicating the publisher of an application using a token. Embodiments may, for example, allow a correlation between publisher identity 210 and an n-dimensional cube against which analytics query 202 may execute. This could be done, for example, when a suite of applications access the same set of analytical data.

A policy set 212 may also be included in access token 204. A policy set 212 may contain information describing one or more rules that may govern the use of the token to access data and analytical functions. For example, a policy set 212 may specify a time period (single-use or recurring, for example) during which the token is valid. Another example may involve limits on the type of queries that may be executed. Other examples include, but are not limited to, a maximum number of simultaneous users, a maximum number of times the token may be used, information indicative of a subscription plan or other cost bases for using the token, information describing a limit on the cost that can be incurred, and so on.

An analytics request 200 may be transmitted over network(s) 214 to a hosted analytics service 216. A hosted analytics service 216 may provide access to analytics involving data sources 226. A variety of data sources 226 may be involved. These may include, but are not limited to, additional data repositories maintained by the provider of hosted analytics service 216, externally hosted data repositories, real-time data from streaming sources (such as log files, videogames, and so forth), web-based sources, and so on. An n-dimensional cube maintenance 228 module may populate n-dimensional cubes 224. Elements of an n-dimensional cube maintenance 228 module may include a multiplexing update pipeline for performing operations, such as data cleansing, data aggregation, and n-dimensional cube population.

An access control 218 module may regulate access to analytic services based at least in part on an access token 204 received in an analytics request 200. Access token 204 may be a component of a multi-factored authentication scheme. For example, analytics request 200 might include access token 204 and one or more additional factors, such as a password, which may be used to validate that the use of the token is authorized. In various embodiments, access control 218 may perform operations to associate a received analytics request 200 with an n-dimensional cube, of n-dimensional cubes 224, that corresponds to an n-dimensional cube identity 206 contained in access token 204. In some embodiments access control 218 may authorize use of an n-dimensional cube selected from n-dimensional cubes 224 based on other criteria.

An access control 218 module may enforce policies defined in a policy set 212 included in an access token 204 supplied in conjunctions with analytics request 200. For example, access control 218 may determine if analytics request 200 has been received during a permitted time period, outside of which such requests are not honored. Access control 218 might also enforce policies, such as limits on the type of queries that might be executed, the identity of users able to execute the queries, and so forth.

Analytics engine 222 may process analytics request 200 subsequent to or in conjunction with processing by access control 218. In various embodiments, access control 218 may pass analytics query 202 and information indicative of an associated n-dimensional cube to analytics engine 222 for processing.

Figure 3:
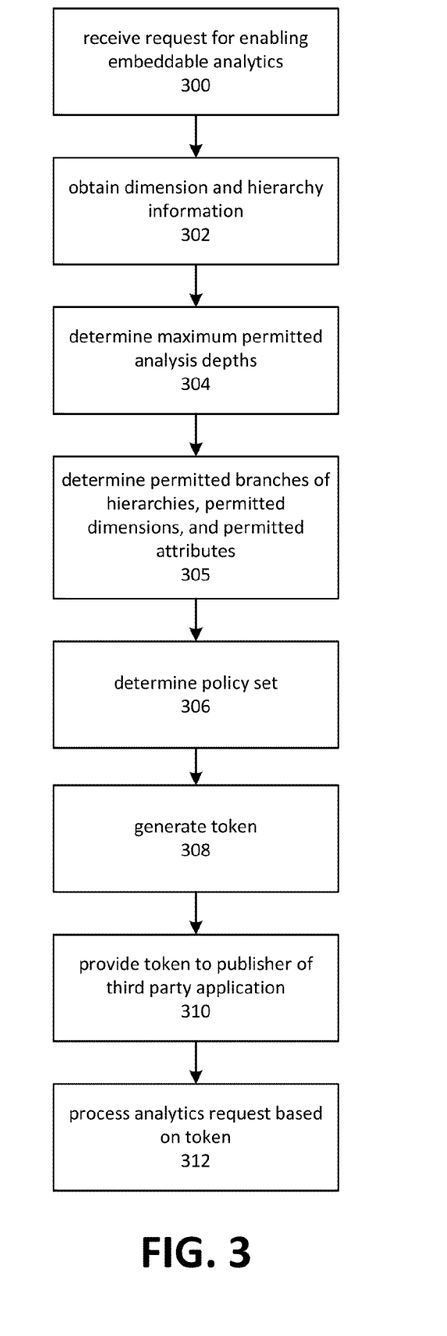
FIG. 3 is a flowchart depicting a process for embedding and sharing cloud-based analytics.

FIG. 3 is a flowchart depicting a process for embedding and sharing cloud-based analytics. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 300 depicts receiving a request for enabling embeddable analytics. A request may be made by a publisher to a provider of hosted analytics services. A publisher may include entities that develop or make available applications that utilize the hosted analytics services. A request to enable analytics services may be issued electronically, and may comprise information indicative of one or more data sources, one or more dimensions, cost and budget information, and so on. For example, a request might supply information describing a data source to be used to build an n-dimensional cube with which analytics will be performed, and a budget indicating a maximum cost that the publisher is willing to pay in order to enable analytic services.

In various cases and embodiments, operation 300 may involve publication of a visualization, such as a graph, chart, report, or dashboard, to a marketplace for analytics. A customer of a service provider may utilize various visualizations to perform data analytics, and then invoke operations that enable the visualization to be used by others. In some cases and embodiments, a visualization to be published may be used in conjunction with a transactional system. For example, a customer of a hosted database maintaining transactional data may run queries that generate a report. The customer may wish to share this report on an ongoing basis, but does not wish to provide others with access to the transactional data. A request may then be issued to an embodiment of the present disclosure to enable embeddable analytics of the data. An embodiment might analyze the queries or perform other steps to determine elements of a data analytics platform needed to provide access to the report, and then proceed to provide third parties with access to the report as depicted in FIG. 3. Note that the analytical features of the report may be provided through an n-dimensional cube maintained by the provider of the hosted analytics service, rather than directly accessing the customer's transactional data.

Operation 302 depicts obtaining dimension and hierarchy information from various sources. Dimension and hierarchy information may be explicitly provided with a request to enable analytics. In some embodiments, dimension and/or hierarchy information may be inferred through various automated processes, or imported from another source.

Operation 304 depicts determining maximum permitted analysis depths. Analysis depth may pertain to the granularity with which data may be examined or drilled down into. For example, in some cases a publisher may wish to enable analytics on sales data that includes details, such as per-country sales, per-region sales, and per-store sales. The publisher might wish to permit analysis on per-country and per-region sales data, but not the per-store sales data. The depth of analysis could be set to a level that would constrain any analytics operations to those that use per-country or per-region data. In some cases, data below a permitted level of analysis may be excluded from any n-dimensional cubes associated with the enabled analytics. The permitted level of analysis may be referred to as a maximum depth of analysis. Requests to perform analytics that would cause the maximum depth to be exceeded may be rejected or may be processed by utilizing data at no more than the maximum depth.

Operation 305 depicts determining permitted or restricted hierarchies, branches of hierarchies, dimensions, and attributes. Together with permitted analysis depths, these characteristics may define a subset of data within an n-dimensional cube that may be used to perform data analytics operations. Embodiments may, for example, permit queries to be processed using the n-dimensional cube provided that the queries do not reference data outside the subset. Embodiments may allow references to aggregate values based on data outside of the subset.

Authorization to access data points within an n-dimensional cube may be granted or denied for data points corresponding to branches of a hierarchy. For example, aggregates of sales data from a previous calendar month might be made viewable, whereas aggregates for the current month might be made unavailable. Similarly, access to data points corresponding to particular dimensions may be permitted or denied, as may access to attributes. Embodiments may also prevent information pertaining to particular branches, dimensions, and attributes from being displayed. For example, an embodiment might prevent any description of an unauthorized attribute or dimension from being accessed.

The various access rights and restrictions determined in operations 304 and 305 may be based on requirements of a visualization component. A visualization component may be published by a first customer of an analytics marketplace for distribution to other customers. Analysis of the visualization component, which may be performed by various embodiments, may identify application behaviors and access patterns related to n-dimensional cube access and then, based on the behaviors and access patterns, determine a subset of data points within the n-dimensional cube that should be permitted or restricted. Embodiments may also provide for customer control over the permitted or restricted data points.

Operation 306 depicts determining a policy set. A policy set may comprise various aspects of controlling access to analytics. These aspects may include those pertaining to time windows for access, expiration dates, revocation, cost, budget, security, and so forth. A policy set may also include dimension and hierarchy information, permitted analysis depths, and so forth.

Operation 308 depicts generating a token indicative of a policy set, related n-dimensional cubes, and other information controlling access to a hosted analytics services. As depicted by operation 310, a token generated in operation 308 may be provided to the publisher of a third-party application.

Figure 4:
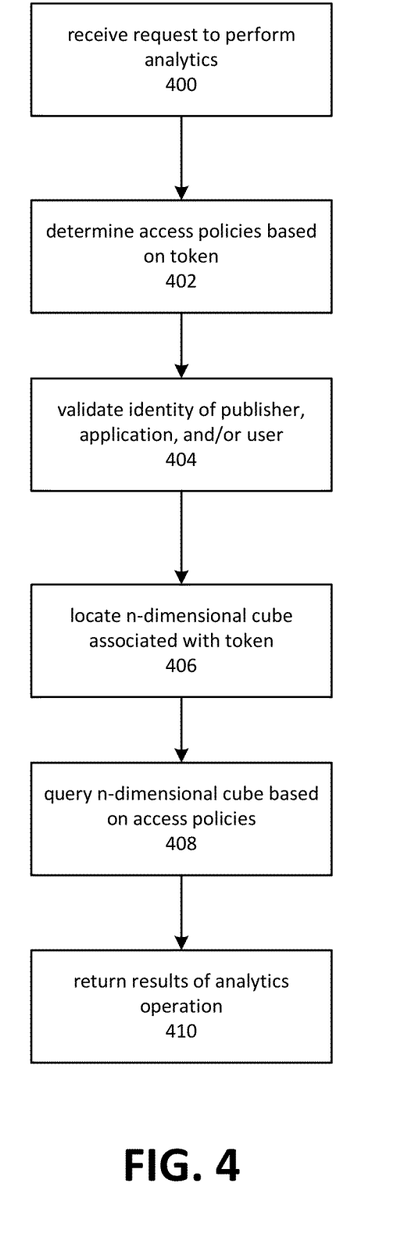
FIG. 4 is a flowchart depicting a process for performing analytics operations based on a supplied token.

As depicted by operation 312, a hosted analytics service may process a request to perform an analytical operation based in part on a token supplied with the request. Applications may support embedded analytics by maintaining access to the token and supplying it with requests issued to a hosted analytics service. FIG. 4 is a flowchart depicting a process for performing analytics operations based on a supplied token. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 400 depicts receipt of a request for performing an analytics operation. The request may include a token issued to a publisher of a third-party application program. At operation 402, the token may be used to determine various access policies pertaining to the third-party application's use of the analytics service. In various embodiments, the access policies may be self-described by the token with information indicative of the access policies being embedded in the token itself. In other embodiments, various forms of indirection may be used, such as cross-referencing between information embedded in the token and a repository of policy settings. Embodiments may also employ a mix of these approaches.

Operation 404 depicts validating identities of an application publisher, an application, and/or a user associated with a submitted request. Some embodiments may omit this operation in favor of using self-describing properties of the token. Other embodiments may perform this operation, or a similar operation, as a second level of validation. Embodiments may, for example, validate the identity of an application, application publisher, or user as a second level of authentication in addition to the token. A validated identity may also be used as an entry point into imposing a second level of access policy. For example, a validated identity might be compared against a list of revoked tokens, or tokens describing policies whose properties are to be augmented or diminished in some way after issuance of the token.

Operation 406 depicts locating an n-dimensional cube associated with a token supplied in a request to perform an analytics operation. In some embodiments, there may be a one-to-one correspondence between issued tokens and n-dimensional cubes, while in other embodiments the relationships may be one-to-many or many-to-one. Embodiments may utilize association between a token and an n-dimensional cube as a technique for enforcing security and access rights, for example, by associating a token with n-dimensional cubes that contain permitted levels of detail and may not be associated with a token with n-dimensional cubes that contain more detail or other information than is permitted.

An n-dimensional cube may be located using techniques, such as maintaining a mapping between a subset of a token that is indicative of the n-dimensional cube's identity and the n-dimensional cube itself. For example, the subset of the token may refer to a storage location of an n-dimensional cube. In processing requests to perform data analytics operations, embodiments may utilize the mapping to locate one or more files that comprise the n-dimensional cube, load or partially load the files, and process the request. This approach may allow processing of the data analytics operation to be performed in a stateless manner, or, in other words, without requiring the n-dimensional cube to remain loaded while not performing relevant data analytics operations using the n-dimensional cube. This, in turn, may improve scalability of a data analytics system with respect to the number of n-dimensional cubes that may be supported. A provider of hosted data analytics services may allocate one or more n-dimensional cubes to each customer, to each application, and so on. Accordingly, this approach may allow a large number of customers, applications, and so forth to be provided with analytics services.

As depicted by operation 408, embodiments may query an associated n-dimensional cube in a manner that is consistent with access policies indicated by a supplied token, or policies indicated through other means. Results of performing the analytics operation may then be returned to the requesting application, as depicted by operation 410.

Figure 5A:
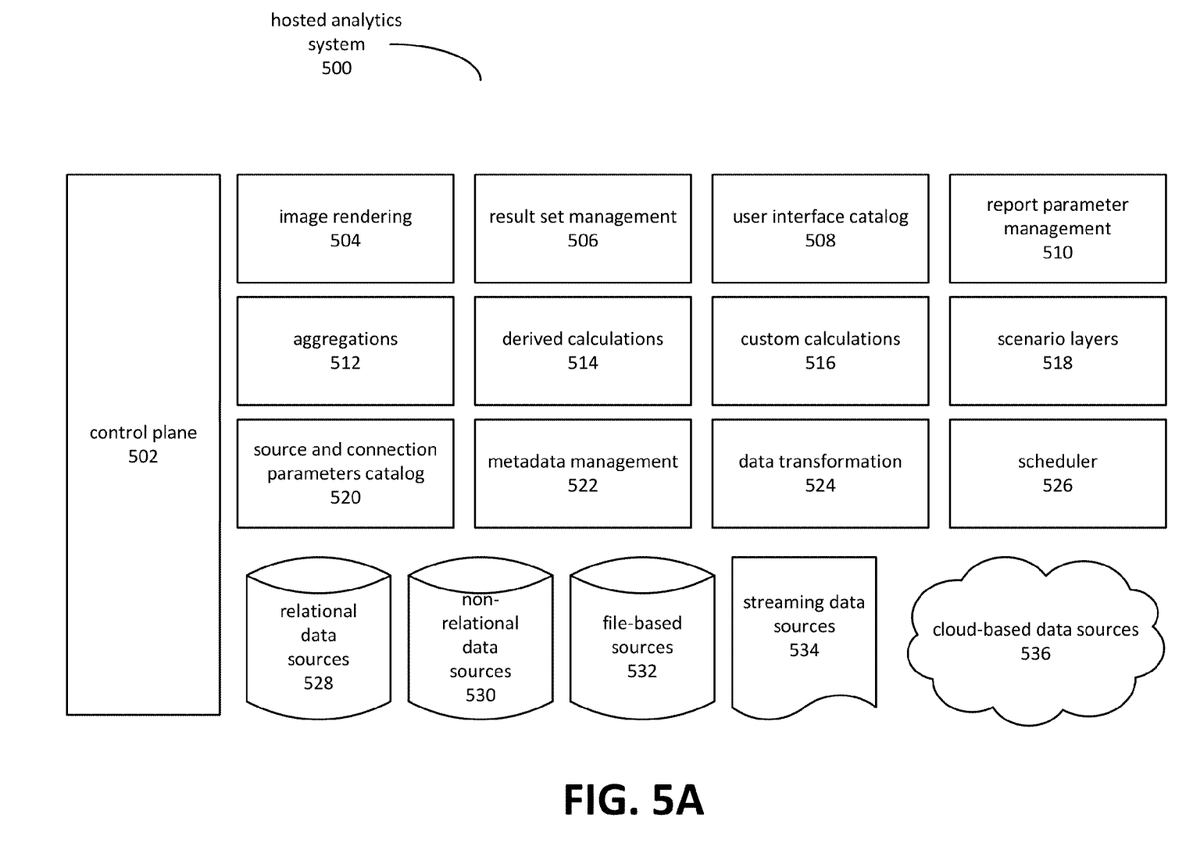
FIG. 5A is a block diagram depicting an embodiment of a system for providing hosted analytics services.

FIG. 5A is a block diagram depicting an embodiment of a system for providing hosted analytics services. A hosted analytics system 500 may be managed by a control plane 502 that coordinates activities of various modules of the system.

An image rendering 504 module may provide rendering services for embedded user-interface components, such as graphs and charts. A result set management 506 module may maintain history information, data caches, and so forth pertaining to results of performing an analysis. A user interface catalog 508 module may maintain a repository of user interface elements for embedded analytics, such as images and so forth, that might be inserted in the user interface of an application that includes embedded analytics features. A report parameter management 510 module may comprise a repository of parameters to be used in generating analytical reports, such as time periods, geographic region, dimensions to include in a report, desired drill-down levels, and so on.

An aggregations 512 module may perform operations to calculate aggregate values in various dimensions and combinations of dimensions. For example, aggregations 512 module may calculate monthly, weekly, and daily sales data for a particular store, geographic region, and state.

A derived calculations 514 module may perform second-order calculations based on aggregate data and other information. A custom calculations 516 module may perform report-specific or user-provided calculations. Custom calculations may be provided, for example, by an application publisher.

A scenario layers 518 module may perform operations related to simulations, projections, or other types of "what-if" scenarios. These may be custom scenarios provided, for example, by an application publisher.

A source and connection parameters catalog 520 may maintain information used to locate and connect to various information sources. Information for locating sources may include network address, uniform resource locators ("URLs"), and so forth. Information for connecting may include various forms of credentials, accounts, user names, and so forth.

A metadata management 522 module may maintain various forms of metadata and other information used in interfacing with various data sources, such as relational data sources 528, non-relational data sources 530, file-based sources 532, streaming sources 534, and cloud-based data sources 536. Embodiments may employ metadata from metadata management 522 module in conjunction with data transformation 524 module. Data transformation 524 module may perform data transformation and data cleansing operations on incoming data.

A scheduler 526 module may coordinate the timing of various activities performed by hosted analytics system 500. The coordination may involve scheduling n-dimensional cube rebuilding, scheduling data retrieval, and so forth.

Various data sources may be employed. These include relation data sources 528, such as SQL-based relational database management systems, as well as non-relational data sources 530. Various non-relational data sources 530 may include NoSQL database systems, key-value pair databases, object-relational databases, and so forth. Various file-based sources 532 may be used, such as document repositories, log files, and so forth. Log files may also be treated as streaming data sources 534, which may also include other types of data sources where data may be updated on an ongoing basis.

Another example that may be categorized with other streaming data sources 534 is data generated from videogames, such as multi-player video games.

Various types of cloud-based data sources 536 may be used. These may include various web sites or data sources maintained by a provider of hosted analytics services, an application publisher, a user of an application, or a third party.

Figure 5B:
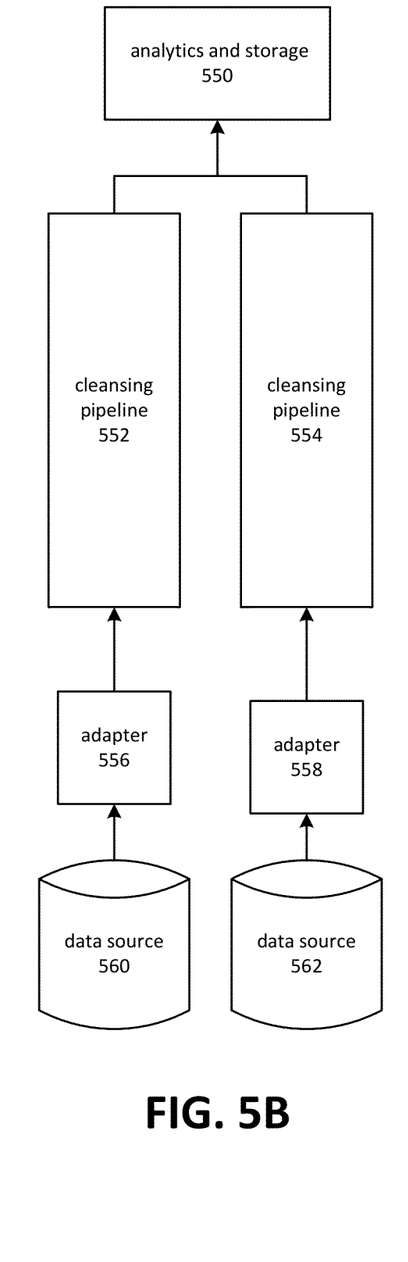
FIG. 5B depicts a process for intake and processing of data from real-time data sources.

FIG. 5B depicts a process for the intake and processing of data from real-time data sources. A data source 560 may be communicatively coupled to an adapter 556 and a cleansing pipeline 552. Additional data sources, such as data source 562, may be communicatively coupled to other adapters and pipelines, such as adapter 558 and cleansing pipeline 554.

An adapter 556 may transform data from data source 560 to a format suitable for processing by cleansing pipeline 552. Operations performed by cleansing pipeline 552 may include performing one or more translations or transformations on incoming data. Examples include stemming, lemmatisation, and so forth. A cleansing pipeline 552 may be multiplexing. This may include performing cleansing along multiple paths in order to produce data in a normalized format that matches a normalized format used in each destination n-dimensional cube.

FIG. 5B depicts an analytics and storage 550 module. This may refer to various components for performing analytics, such as modules 502-526 in FIG. 5A. Cleansed data incoming from cleansing pipelines 552 and 554 might be processed by an analytics and storage 550 module. The processing might include operations, such as performing aggregation, performing custom calculations, scenario modeling, and so forth. Data from cleansing pipelines 552 and 554, as well as any calculated or derived values, may be routed and stored in an appropriate n-dimensional cube.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
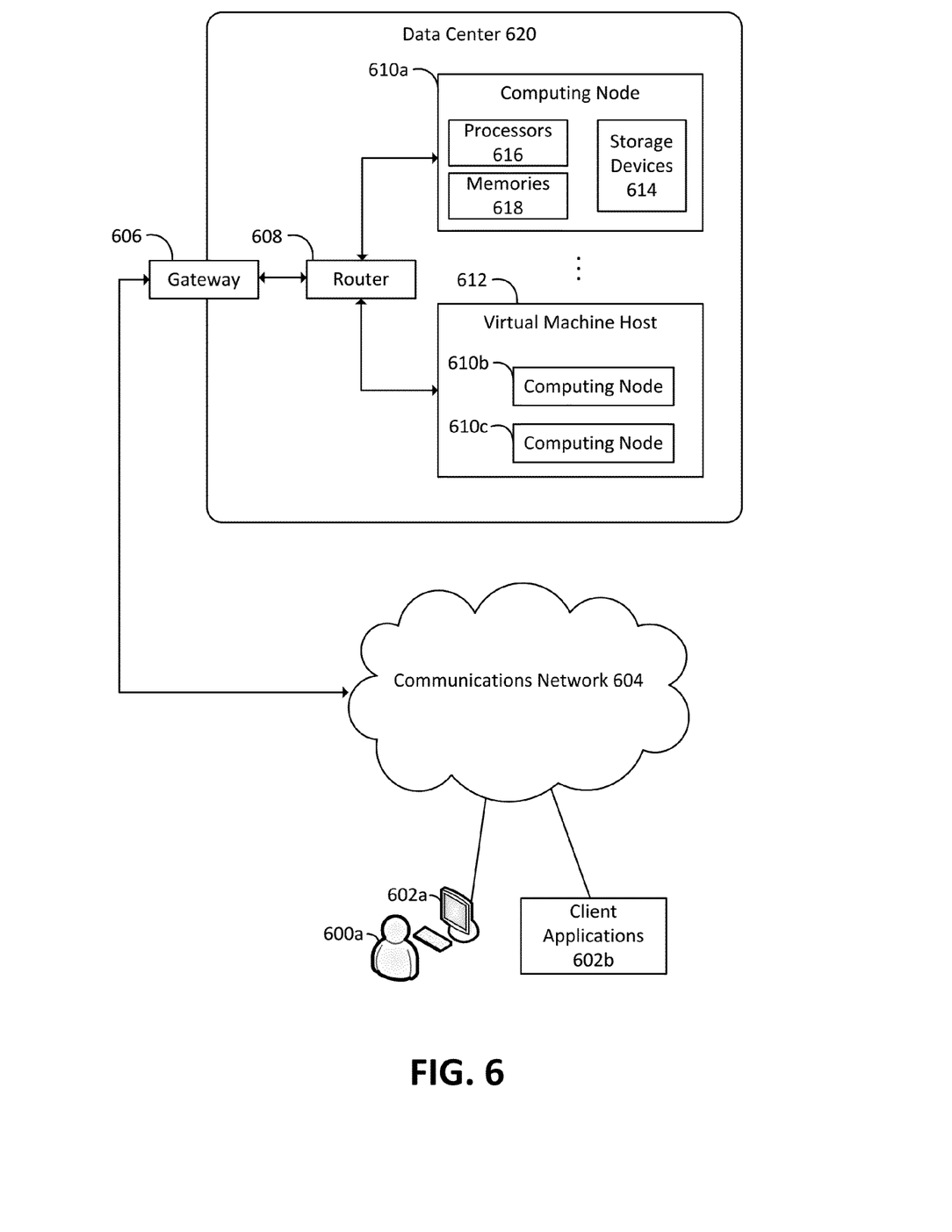
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618, and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
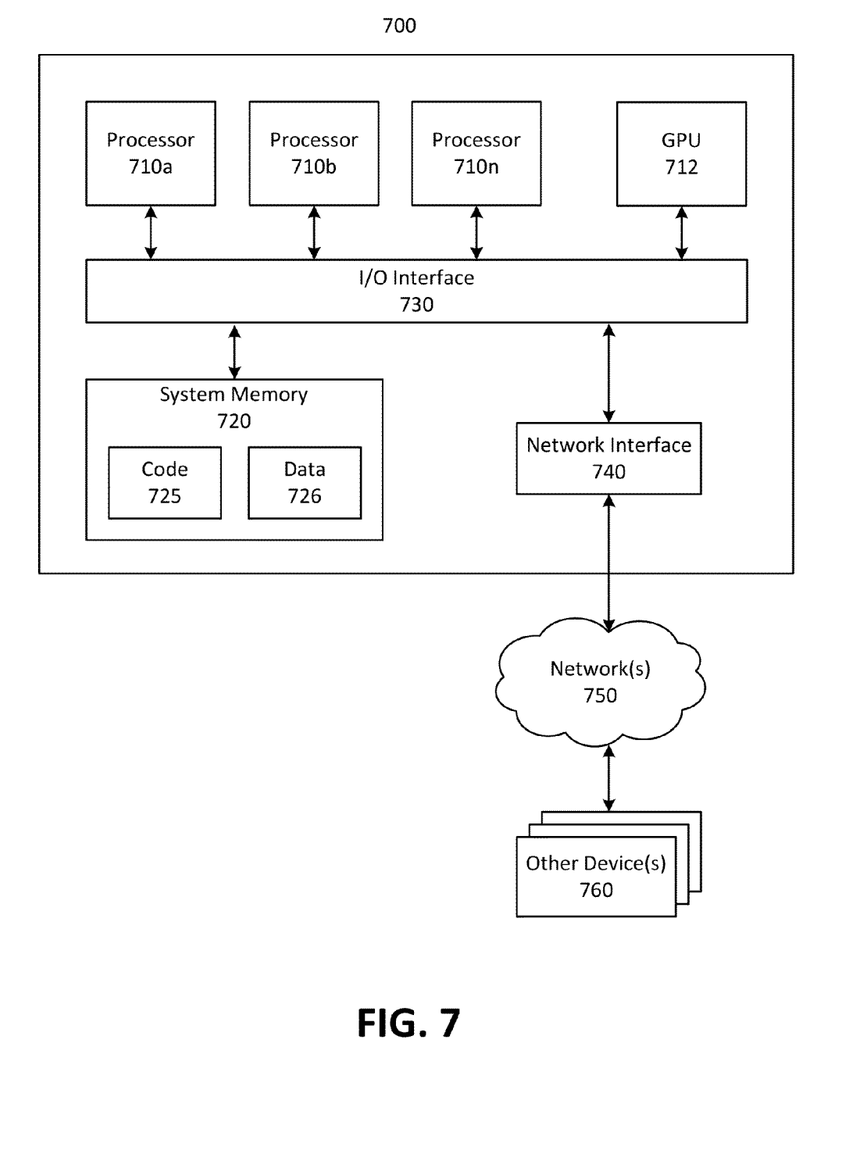
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710)

coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect ("PCI") bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more computing nodes;
   one or more memories having stored thereon computer-readable instructions that, upon execution by the one or more computing nodes, cause the system at least to:
   receive information indicative of enabling data analytics operations in an application remote to the one or more computing nodes, the operations to be performed using an n-dimensional cube hosted on the one or more computing nodes;
   form a token comprising information indicative of an identity of the n-dimensional cube and information indicative of data within the n-dimensional cube that is authorized to be used to perform data analytics operations;
   receive a request to perform a data analytics operation, the request comprising a copy of the token;
   locating the n-dimensional cube based at least in part on the information indicative of the identity of the n-dimensional cube contained in the copy of the token; and
   performing the data analytics operation by at least accessing data in the located n-dimensional cube, the accessing based at least in part on the information indicative of data within the n-dimensional cube that may be used to perform the data analytics operations.

2. The system of claim 1, further comprising one or more memories having stored thereon computer-readable instructions that, upon execution by the one or more computing nodes, cause the system at least to:
   associate an access policy with the token, the access policy maintained on the one or more computing nodes, the access policy indicative of a valid time period for using the token to perform data analytics operations.

3. The system of claim 1, further comprising one or more memories having stored thereon computer-readable instructions that, upon execution by the one or more computing nodes, cause the system at least to:
   determine that at least one or more of the application, a publisher of the application, or a user of the application is authorized to receive a result of performing the data analytics operation, the determination based at least in part on the copy of the token.

4. The system of claim 1, further comprising one or more memories having stored thereon computer-readable instructions that, upon execution by the one or more computing nodes, cause the system at least to:
   load at least a subset of the located n-dimensional cube into a memory of the one or more computing devices, based at least in part on the information indicative of the identity of the n-dimensional cube contained in the copy of the token.

5. A computer-implemented method of embedding data analytics functionality into an application, the method comprising:
   receiving information indicative of enabling data analytics operations for the application, the operations to be performed on an n-dimensional cube hosted by one or more computing nodes remote to the application;
   forming a token comprising information indicative of an identity of the n-dimensional cube; and
   receiving, from the application, a request to perform a data analytics operation, the request comprising a copy of the token; and
   performing the data analytics operation by at least locating the n-dimensional cube using the information indicative of the identity of the n-dimensional cube contained in the copy of the token and accessing data in the located n-dimensional cube.

6. The computer-implemented method of claim 5, further comprising:
   associating an access policy with the token, the access policy maintained on the one or more computing nodes, the access policy indicative of a valid time period for using the token to perform the data analytics operations.

7. The computer-implemented method of claim 6, wherein the access policy comprises information indicative of at least one of a cost of performing the data analytics operations or a limit on costs to incur by performing data analytics operations.

8. The computer-implemented method of claim 5, further comprising:
   determining that at least one or more of the application, a publisher of the application, or a user of the application is authorized to receive a result of performing the data analytics operation, based at least in part on the copy of the token.

9. The computer-implemented method of claim 5, further comprising:
   preventing access to data in the located n-dimensional cube, based on at least one of the data exceeding a maximum depth that may be accessed while performing the data analytics operation, the data being associated with a restricted attribute, the data being associated with a restricted branch of a hierarchy, or the data being associated with a restricted dimension.

10. The computer-implemented method of claim 9, further comprising:

processing the request to perform a data analytics operation by at least returning hierarchy data at or not exceeding the maximum depth when the data analytics operation would otherwise return data that exceeds the maximum depth.

11. The computer-implemented method of claim 5, further comprising:
locating the n-dimensional cube by mapping from at least a subset of the copy of the token to the n-dimensional cube maintained on the one or more computing nodes.

12. The computer-implemented method of claim 5, further comprising:
distributing the token to at least one of a publisher or user of the application.

13. The computer-implemented method of claim 5, wherein the application comprises a data analytics visualization.

14. The computer-implemented method of claim 13, further comprising:
identifying a subset of data points in the n-dimensional cube accessible to the application for performing data analytics operations, the subset based at least in part on requirements of the data analytics visualization.

15. A non-transitory computer-readable storage medium having stored thereon instructions that, upon execution by a computing device, cause the computing device at least to:
receive information indicative of enabling data analytics operations for an application, the operations to be performed on an n-dimensional cube hosted by one or more computing nodes remote to the application;
form a token comprising information indicative of an identity of the n-dimensional cube and information indicative of data within the n-dimensional cube that is authorized for use in performing the data analytics operations; and
receive, from the application, a request to perform a data analytics operation, the request comprising a copy of the token; and
process the request to perform a data analytics operation by at least locating the n-dimensional cube using the information indicative of the identity of the n-dimensional cube contained in the copy of the token and preventing access to data within the n-dimensional cube based at least in part on the information indicative of data within the n-dimensional cube that is authorized for use in performing the data analytics operations.

16. The non-transitory computer-readable storage medium of claim 15, comprising further instructions that, upon execution by the one or more computing devices, cause the one or more computing devices to at least:
determine an access policy associated with the copy of the token, the access policy maintained on the one or more computing nodes, the access policy indicative of a valid time period for using the token to perform the data analytics operations.

17. The non-transitory computer-readable storage medium of claim 16, wherein the access policy comprises information indicative of a validated identity authorized to perform the data analytics operations.

18. The non-transitory computer-readable storage medium of claim 15, comprising further instructions that, upon execution by the one or more computing devices, cause the one or more computing devices to at least:
determine that at least one or more of the application, a publisher of the application, or a user of the application is authorized to receive a result of performing the data analytics operation, based at least in part on the copy of the token.

19. The non-transitory computer-readable storage medium of claim 15, comprising further instructions that, upon execution by the one or more computing devices, cause the one or more computing devices to at least:
determine the information indicative of data within the n-dimensional cube that is authorized for use in performing the data analytics operations, the determining based at least in part on access requirements of a visualization or an application behavior.

20. The non-transitory computer-readable storage medium of claim 15, comprising further instructions that, upon execution by the one or more computing devices, cause the one or more computing devices to at least:
locate the n-dimensional cube by mapping from at least a subset of the copy of the token to the n-dimensional cube maintained on the one or more computing nodes.

21. The non-transitory computer-readable storage medium of claim 15, comprising further instructions that, upon execution by the one or more computing devices, cause the one or more computing devices to at least:
load at least a subset of the n-dimensional cube into a memory of the one or more computing devices, based at least in part on the information indicative of the identity of the n-dimensional cube contained in the copy of the token.

22. The non-transitory computer-readable storage medium of claim 15, comprising further instructions that, upon execution by the one or more computing devices, cause the one or more computing devices to at least:
form the n-dimensional cube in response to receiving the information indicative of enabling data analytics operations for the application.

* * * * *